Nov. 29, 1927. 1,650,651
N. A. PRESTON
AUTOMOBILE LOCK
Original Filed Aug. 3, 1922 4 Sheets-Sheet 2
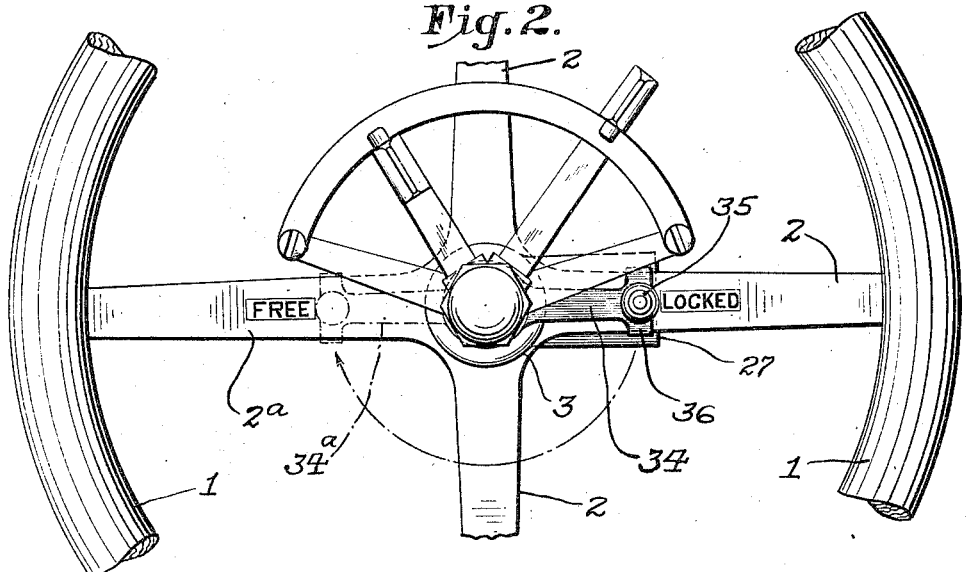
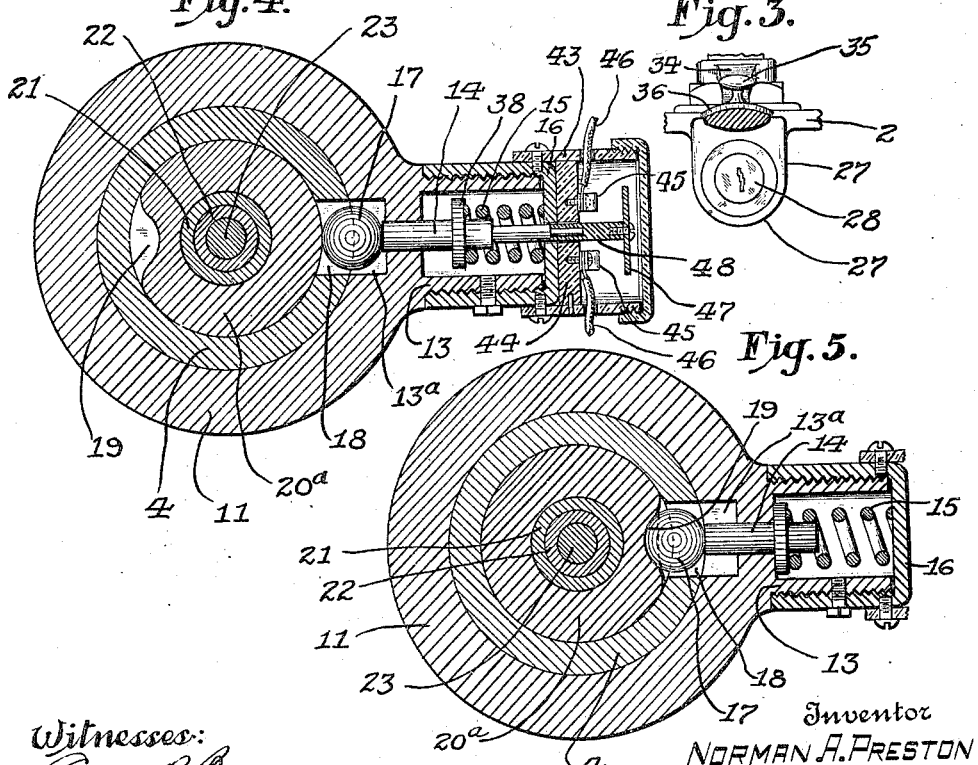
Inventor
NORMAN A. PRESTON
By his Attorney

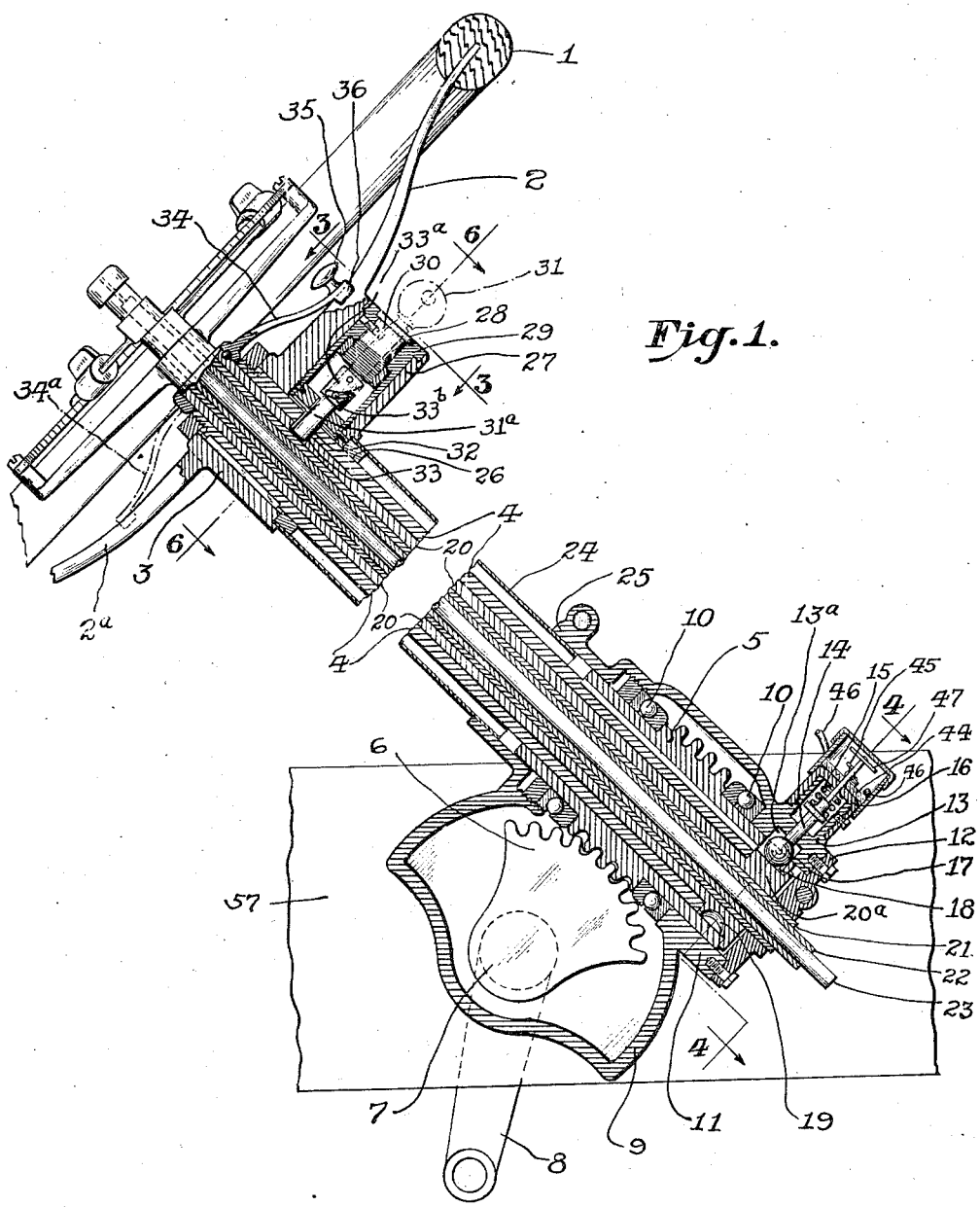

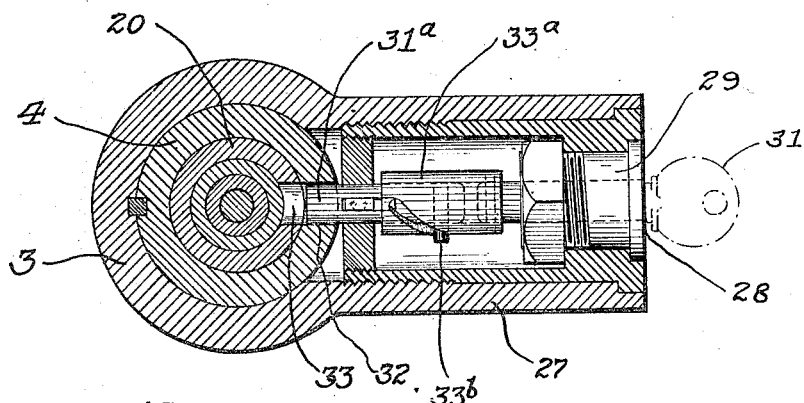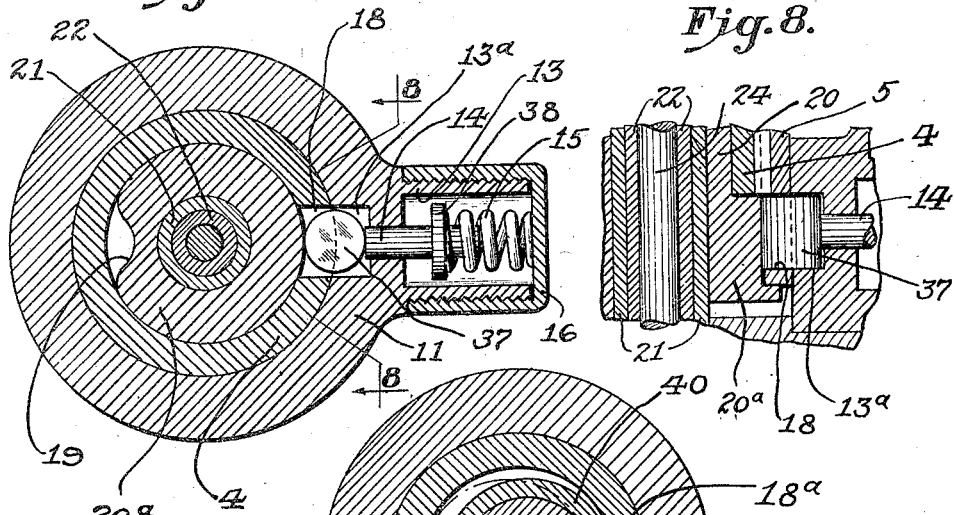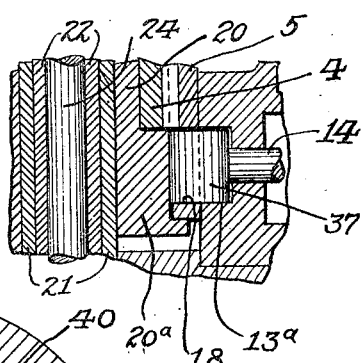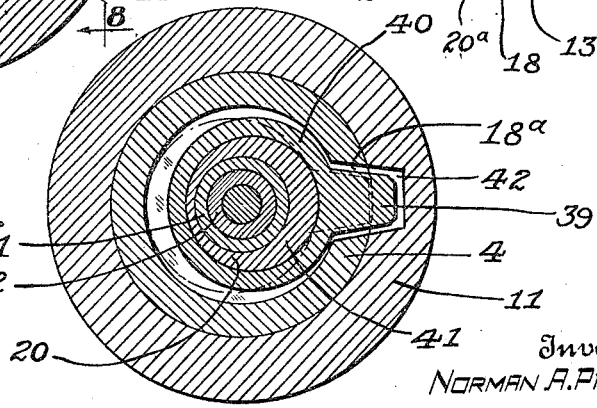

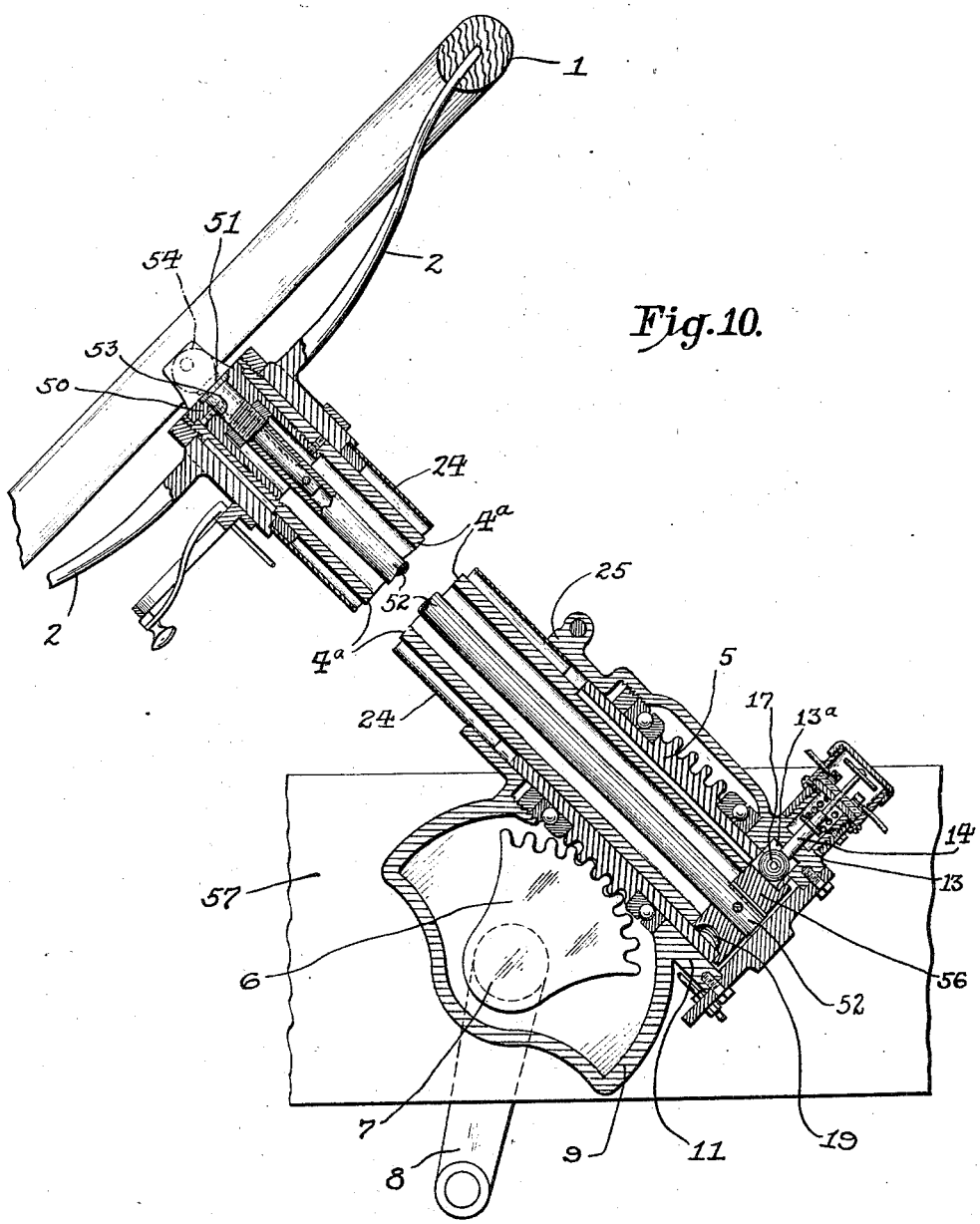

Patented Nov. 29, 1927.

1,650,651

UNITED STATES PATENT OFFICE.

NORMAN A. PRESTON, OF NEW YORK, N. Y.

AUTOMOBILE LOCK.

Application filed August 3, 1922, Serial No. 579,388. Renewed April 18, 1927.

This invention relates to locks or the locking of motor cars to prevent their unauthorized use. More particularly it relates to means for locking an essential part of the operating mechanism of a car such as the steering gear, and to lock the same at a point or place which will most effectually defeat any attempt to unlock or tamper with the parts which effectually incapacitate the ordinary operation of a car. In its preferred form this invention relates to the locking of the steering gear mechanism at the lower end of the steering pillar, to prevent any, or at least all except a very limited movement of the lower end of the steering post and gear, but in conjunction therewith it involves the operation of the lock from a remote point, namely, at the upper end of the pillar so that the act of locking is under the control of a key operation in the most convenient place, namely, adjacent to the steering hand-wheel. More specifically the preferred form of this invention involves the actuation of a lock under key control at the hub of the steering hand-wheel or at the top of the steering column, by connections extending to the lower end of the steering column, and preferably through the hollow steering shaft, to move the actual means for locking parts against rotation, or to free them for normal use, at or near the lower end of the steering shaft, and there to lock the strong and well fitting members of the steering gear which are well adapted as to material and design, to be locked against rotation by a ball, roller, bolt or wedge lock. In conjunction with such mechanical locking to prevent the steering of the automobile, there may be provided means for cutting out the ignition current of the motor as in gasoline cars, so that when the steering gear is locked it is impossible to start the motor. Likewise similar arrangements would prevent the starting of an electric car when the steering gear is locked.

As will be hereinafter described, this form of locking of cars lends itself particularly to the permanent embodiment of suitable mechanism when manufacturing and assembling the parts in the production of motor cars, so that the inventions hereinafter described apply in particular to factory product as distinguished from locks heretofore used as accessories to be affixed by the owner after the car has been completed and delivered from the factory. As a factory feature of construction it lends itself to ready adaptation as an integral part of the structure by reason of suitability with respect to strength of material, simplicity and cheapness of construction, and non-interference with any existing features of construction or design.

In any form of embodiment of my invention it is essentially a completely enclosed and hidden mechanism most admirably adapted to defy tampering to defeat the object of a lock,—it in no way interferes in any way with the appearance of the structure, the essential locking parts are always invisible, while the means for operating and the means to indicate whether the car is locked or free to operate are directly before the eyes of the operator when taking his position for driving the car.

Many of the other advantages incident to the practice of my invention will be noted in conjunction with the more detailed description of gear embodiments of my invention, shown in the accompanying drawings forming a part hereof, in which:

Fig. 1 is a vertical section on the axis of a steering column showing all parts of a locking and lock-operating mechanism containing the invention.

Fig. 2 is a plan view of a steering hand-wheel showing lock-operating lever arrangement.

Fig. 3 is a side elevation, fragmentary, showing the key lock part of the operating mechanism, on section 3—3 of Fig. 1.

Fig. 4 is a cross-section in the plane 4—4 of Fig. 1, showing the locking parts in locked position.

Fig. 5 is a similar cross-section slightly modified, showing the parts in unlocked position.

Fig. 6 is a cross-section on the line 6—6, Fig. 1, of the lock-operating parts and the key lock bolt in unlocked position.

Fig. 7 is a cross-section of the locking parts at the bottom of the column, similar to Fig. 5, slightly modified.

Fig. 8 is a section on the axis of a steering column on the line 8—8 of Fig. 7.

Fig. 9 is a cross-section at right angles to the axis of the steering column showing a modified locking bolt.

Fig. 10 is a vertical section on the axis of the steering column showing the locking and lock-operating parts in modified form, In Fig. 1 the steering column of an automobile, shown in section, omits the middle portion between the steering wheel and the lower or steering gear end, but shows all the parts as they would function in a steering column embodying my invention, in which the hand-wheel 1 has the spider arms 2—2ª splined at their hub 3 to the steering shaft tube 4, which has splined at its bottom the steering worm gear 5 which engages the steering sector 6 carried on its hub 7 and operating the steering bell-crank 8 which connects in the usual manner with the linkage operating the steering rod wheels. The steering worm and sector are carried in the housing 9 with bearings 10—10 supporting the worm in the housing and having a lower gear case enlargement 11 with a bottom cap 12, and on one side a projection 13 containing a pin 14 engaged by a spring 15 under a cap 16, the latter being so arranged as to project the pin 14 radially inward by the spring pressure to force a locking-ball 17 normally through a hole 18 in the lower end of the steering shaft tube 4, and into a recess 19 formed in one side of the lower end 20ª of a locking tube 20.

This locking tube 20 fits inside of the steering shaft tube 4, and as shown in Fig. 1 has additional tubes 21 and 22 and a central rod 23, these latter three being the usual tubes and rod which pass through the steering column and are operated from the hand-wheel position to move the throttle ignition or other control connections from the bottom of the steering column.

Outside of the steering shaft tube there is a housing or casing 24 clamped to the steering gear case at 25, and at its upper end 26 engaging the hub 3 of the steering hand-wheel, which has at one side an integral boss 27 formed to accommodate a lock 28 set preferably in a hardened steel ferrule 29 and having the usual lock control tumblers in barrel 30, with a key 31, shown dotted, which upon turning projects a bolt 31ª in a direction radial to the axis of the steering column through a hole 32 in the steering shaft tube 4 and into a hole 33 formed in the locking tube 20, so as to lock the steering shaft tube and the locking tube together in predetermined positions, by rotation of the sleeve 33ᵇ engaging the pin 33ᵇ of bolt 31ª.

To the top of the locking tube 20 a locking lever 34 is secured with a suitable finger-knob 35 and a straddle clamp 36 adapted to engage the spider arm 2, or, as shown in dotted position, engages the spider arm 2ª.

As shown in Figs. 7 and 8, the steering shaft tube 4 has the recess 18 accommodating a roller locking member 37 adapted to be located for locking the steering gear casing boss 11 and the lower end of the steering shaft tube, and to be pressed out of locking position by means of the pin 14 and spring 15 engaging the collar 38 which is so positioned that the spring drives the locking roller 37 out of locking position into the recess 19, but prevents the inner end of the pin from interfering with the rotation of the lower end of the steering shaft tube. The same collar and pin relation serves the same purpose when the ball construction, as shown in Figs. 4 and 5, is used to effect the locking. In the modified form shown in Fig. 9, a locking dowel or pin 39 is formed on an eccentric sleeve 40 carried on an eccentrically formed lower end 41 of the locking tube, so that the relative rotation of the locking tube 20 actuates its eccentric lower end, to project pin 39 radially outward through the recess 18ª in the steering shaft tube 4 and into a locking recess 42 in the boss 11 formed in the steering gear casing. In this modification the eccentric action causes a tilting arrangement of the locking pin 39, which is accommodated by a looseness in the engagement in the hole and the locking recess 42, and this looseness when in locked position permits of a slight turning of the steering worm, which degree of looseness can be regulated or predetermined to permit a slight deflection of the steering road wheels to the extent necessary to push an automobile and steer it away from a curb, or for similar limited motion which is desired and in some cases is required even in the case of automobiles locked against unauthorized use.

As shown in detail in Fig. 4, and also as shown in Fig. 1, there is associated with the lock releasing pin 14, a cutout switch contained in an extension on the boss 17 as in a cap 43 attached thereto, with an insulation plate 44 having two contacts 45—45 and lead wires 46—46 which form part of the ignition circuit for the engine of the automobile. A switch plate 47 is carried by an extension rod or pin 48 on the end of the lock releasing pin 14, so that when the ball 17 is forced into locking position out of the recess 19, it projects the pin 14 against the pressure of the spring 16 and simultaneously raises the switch plate 47 out of engagement with the contact plates 45—45, thereby cutting the circuit by cutting the lead wires 46—46 carrying the current in the ignition system, or in a thief alarm system.

In the modifications shown in Fig. 10, a lock is placed axially in the upper end of the steering column, with a lock having its cylinder 50 secured into the upper end of the steering shaft tube 4ª, and barrel 51 positioned in the cylinder 50 which latter is secured against rotation in the upper end of the steering shaft tube 4ª, as by pin 53 and a second pin if desired, as shown on the other end of the cylinder. The lock barrel 51 is secured to the lock operating shaft 52 so that turning of the barrel by the key 54 turns the shaft 52 and the lower cam block 56 to actuate the ball 17, either by projecting it radially into the locking position shown in Fig. 10, or when the cam block 56 is turned around to the unlocking position, ball 17 recedes from the locking position being pressed into the recess 19, owing to the spring pressure on the pin 14. In this form the cooperating cylinder and barrel of the lock are accommodated in the upper end of the steering shaft tube, and the usual arrangement of tumblers are actuated by the key 14, being so arranged that the insertion of the key 54 permits the turning of the barrel within the cylinder, but when the key is withdrawn the tumblers lock the barrel in either of two positions, namely, that which registers locking at the opposite end of the post, or the unlocked position at the lower end of the post. This form provides a simplified embodiment of the invention, particularly adaptable when no other internal operating tubes or wires are used within the steering shaft tube.

It will thus be seen that in the embodiment of my invention illustrated in the accompanying drawings, provision is made for locking the steering worm gear at the lower end of the steering column, by a concealed locking ball, roller or pin, and any other similar means. This locks one of the most substantial parts of the steering mechanism against rotation in an equally substantial part, namely, the casing for the steering gears, and the locking by this manner can be effected at such a diameter of parts, as to constitute a most substantial lock against rotation so as to meet all requirements of strength. The lower end of the steering column may have a cap rigidly secured thereto and difficult to remove, but in any event the locking is effected at a most inaccessible place which would be difficult to reach, and therefore defies tampering with most effectually, while any attempt to mutilate the lower end of the steering gear would not release the inside locking means except it were accompanied by such extensive destruction of the parts of the steering mechanism as to permanently disable the vehicle for further use. While the actual locking is effected at this remote and inaccessible position, the actuation of the lock is effected from the most accessible position, namely, at the steering hand-wheel, and as shown in the first figures, the keyhole is most accessible directly under one of the spokes of the hand-wheel spider and integrally embodied therewith in a form admirably defying tampering, while in Fig. 10 it is equally accessible at the top in the axis of the steering column or the centre of the steering hand-wheel where all of the parts of the lock are admirably positioned and protected against tampering. In any event, tampering with the operating mechanism in any manner except by the use of a proper key, would involve destruction of parts locally only and would not release, and in fact would prevent the release of the actual locking devices at the remote end of the steering column.

By adding a cutout switch for ignition, and by having this cutout switch actuated in conjunction with the remote locking means assures the cutting out of the motor so as to prevent the starting of the car which might otherwise be attempted before it was realized that the steering gear was locked. This, therefore, constitutes a safety factor to prevent the owner from starting his motor before unlocking his car, and in addition prevents the starting of the motor by unauthorized persons.

In operating locking devices embodying this invention, it will thus be seen that by insertion of the key 31 and retracting the bolt 31$^a$, the actuating sleeve or tube 20 is free to turn inside of the steering shaft tube 4, and by means of the finger-hold 35 the arm 34 is sprung up to disengage the end clip 36 from the spider 2, and the lever 34 is turned around into the position 34$^a$, thereby turning the tube 20 and turning the lower end so that the recess 19 registers with the hole 18 in the sleeve or hub of the gear 5, and the pin 14 actuated by the spring 15, forces the ball into the recess 19, and therefore out of engagement with the wall 13 of the fixed gear casing, in which position the entire steering shaft and gear are free to turn within the casing for normal steering. In this position the upper end of the lock control sleeve 20 is again locked by turning the key 31 and projecting the bolt 31$^a$ radially inward, so as to lock sleeve 20 and steering shaft tube 4 against relative rotation, which positively prevents any chance of accidental movement of the lower end of the lock-operating tube, although the lever 34 will under ordinary conditions be held in its position 34$^a$ by its spring engagement and clip members 36 straddling the arm 2$^a$ of the spider. The reverse condition, as shown in Fig. 2, is the locked condition, with the ball 17 locking the lower members, as shown in the section Fig. 1 and in the large section Fig. 4. In this locked position it is essential to have the key 31 project the locking bolt 31$^a$ into the position shown in Fig. 1, which therefore prevents the operation or turning of the lever 34 without the entire destruction of the locking bolt 31$^a$ or the material of the tubes which are locked thereby.

Similarly in the form shown in Fig. 10, the key 54 serves to lock the upper end of the lock-operating rod or tube 52 in non-rotative relation to the upper end of the steering shaft tube 4$^a$, when the lower end locking ball or pin has been projected into locking position by rotation of the cam 56, and the key also serves to lock the upper end when the recess 19 in the cam 56 at the lower end is turned to an unlocked position with the ball forced into recess 19 by the spring actuated pin 14.

The materials used, it will be apparent, are suitable steel or hardened members adapted to withstand the strains, and the parts associated with the key-lock are case-hardened steel or such other suitable material as will resist any ordinary methods of tampering. Locks of suitable form may vary in detail, and other parts of the locking and lock-operating members may be modified in various ways to accomplish the purposes of my invention. In its various forms, this invention is adaptable to the different designs of steering column and steering mechanism parts, and it is understood will be designed in detail to fit the particular steering mechanism to which it is applied. It may be made, as shown, with all parts concealed except the key-lock hole, and in the form shown in the first figures the single lever at the upper end serving to turn the actuating locking mechanism.

Without limiting myself to the particular embodiments herein shown and described, what I claim and desire to secure by Letters Patent is:

1. An automobile lock comprising means enclosed and protected within the casing of the steering column to lock the steering gear, automatic actuating means for said lock in proximity thereto and a device remote therefrom to control said locking means.

2. An automobile lock comprising a permanently enclosed means for locking the steering gear adjacent the lower end of the steering column, lock controlling means remote therefrom, and a separate actuating device in proximity to said locking means.

3. An automobile steering gear lock having at the lower end of said column and permanently enclosed within said column and gear casing a means, including a detached member movable in a recess, for automatically locking one of the steering gears, and means at the upper end of the steering column to control said locking mechanism.

4. A steering column for automobiles comprising an outer column casing rigidly secured to a steering gear casing, locking means enclosed in the gearing case and actuating means to control said locking means completely enclosed within the column with a remote manipulating handle at the head of the column.

5. A steering gear lock comprising in combination with a steering column and its steering gears, a steering shaft, a complete casing enclosing the gears and shaft in the column, means within said casing and in proximity to the steering gears to lock said steering shaft against rotation in the casing, and means cooperating therewith including a spring actuated contact-piece to break an electric circuit upon the setting of said lock.

6. In a steering gear for automobiles, a steering hand-wheel, a key-lock embodied therewith, lock gear positioning means adapted to be locked by said key-lock to rotate with the steering hand-wheel, including a remote steering gear locking member and actuating means therefor and a continuous housing surrounding the locking and controlling means whereby tampering with the locking is prevented.

7. An automobile steering gear lock comprising a steering column having a complete housing from the steering hand-wheel to and enclosing the steering gears, gear locking means with automatic actuating means therefor near the lower end of said column and within said housing, means near the upper end of said column for setting said locking means with connections entirely within the housing to set said locking means, a steering shaft, and a key-lock for preventing the release of said gear locking means.

8. An automobile steering gear lock comprising a steering column, gear locking means with automatic actuating means therefor near the lower end of said column, means near the upper end of said column for setting said locking means, a steering shaft, a key-lock for preventing the release of said gear locking means, a continuous casing forming the outer side of said column and contiguous with a casing surrounding the gears and locking means, and an electric switch cooperating with said gear locking means.

9. An automobile steering apparatus lock comprising a continuous rigid casing constituting the housing for the steering shaft column and closure for the gears, an automatic lock to lock the gears against rotation and associated with the gear closure or housing, means to control said automatic lock and prevent action comprising mechanism extending within the housing to the upper end of the column, and means adjacent the upper end of the housing for actuating said means.

In testimony whereof, I have signed my name to this specification this 25th day of July 1922.

NORMAN A. PRESTON.